United States Patent [19]

Liu

[11] Patent Number: 5,205,577
[45] Date of Patent: Apr. 27, 1993

[54] COLLAPSIBLE FOLDING BABY CART COLLAPSE CONTROL MECHANISM

[76] Inventor: Kun-Hei Liu, 2F., No. 32, Lane 200, Tung Hwa Street, Taipei, Taiwan

[21] Appl. No.: 915,634

[22] Filed: Jul. 21, 1992

[51] Int. Cl.$^5$ .................................................. B62B 7/08
[52] U.S. Cl. ..................................... 280/642; 280/650; 280/47.4
[58] Field of Search ............... 280/642, 643, 650, 647, 280/658, 47.4, 47.38

[56] References Cited

U.S. PATENT DOCUMENTS

| 2,886,337 | 5/1959 | Quisenberry | 280/650 |
| 4,907,818 | 3/1990 | Chai | 280/642 |
| 5,018,754 | 5/1991 | Cheng | 280/643 |
| 5,143,398 | 9/1992 | Teng | 280/642 |

Primary Examiner—David M. Mitchell
Attorney, Agent, or Firm—Varndell Legal Group

[57] ABSTRACT

A collapsible folding baby cart collapse control mechanism which includes two upper frames connected between respective hand rails and the handle of a baby cart to hold a cross bar of the back rest, two pull rods movably and respectively attached to the upper frames, two positioning plates respectively connected between the pull rods and the cross bar, two stop plates respectively connected to the positioning plates; and two torsional springs respectively connected between the positioning plates and the stop plates, wherein pulling the pull rods upwards from the upper frames causes the positioning plates to be respectively rotated on the upper frames in disconnecting the stop plates from the respective locating rods on a sub-frame of the baby cart's rear wheel frame, permitting the baby cart to be collapsed.

1 Claim, 6 Drawing Sheets

COLLAPSIBLE FOLDING BABY CART COLLAPSE CONTROL MECHANISM

BACKGROUND AND SUMMARY OF THE INVENTION

The present invention relates to a collapsible folding baby cart collapse control mechanism which prevents a collapsible folding baby cart from being collapsed by mistakes.

The collapse control mechanism of a collapsible folding baby cart according to the prior art, as illustrated in FIGS. 1, 2A and 2B, is generally comprised of a foot lever having two positioning plates on two opposite ends thereof, wherein each positioning plate has a bottom notch hung on a locating rod on a respective sub-frame of the rear wheel frame of the baby cart to be controlled and a safety rod locked by a respective lock plate on the rear wheel frame. After the lock plate has been unlocked from the safety rod, the foot lever is stepped with the foot to release the bottom notch from the locating rod, and therefore the baby cart is collapsed. When in use, people may forget to lock the respective lock plate on the safety rod of the respective positioning plate, and the baby cart may be collapsed by a mistake causing accidents.

The present invention eliminates the aforesaid problem. It is therefore an object of the present invention to provide a collapsible folding baby cart collapse control mechanism which is safe in use and can firmly retain the frame assembly of a collapsible folding baby cart in place once it was opened into operate mode. The present invention utilized two upward pull rods to control locking and unlocking of two positioning plates, and two stop plates to ensure locking of the positioning plates. The collapsible folding baby cart can be collapsed only when the pull rods are pulled upwards from two upper frames, and therefore the baby cart will not be collapsed by any mistake.

DETAILED DESCRIPTION OF THE PREFERRED EMBODIMENT

Figure 1:
FIG. 1 is an elevational view of the frame structure of a collapsible folding baby cart according to the prior art.
Figure 2A:
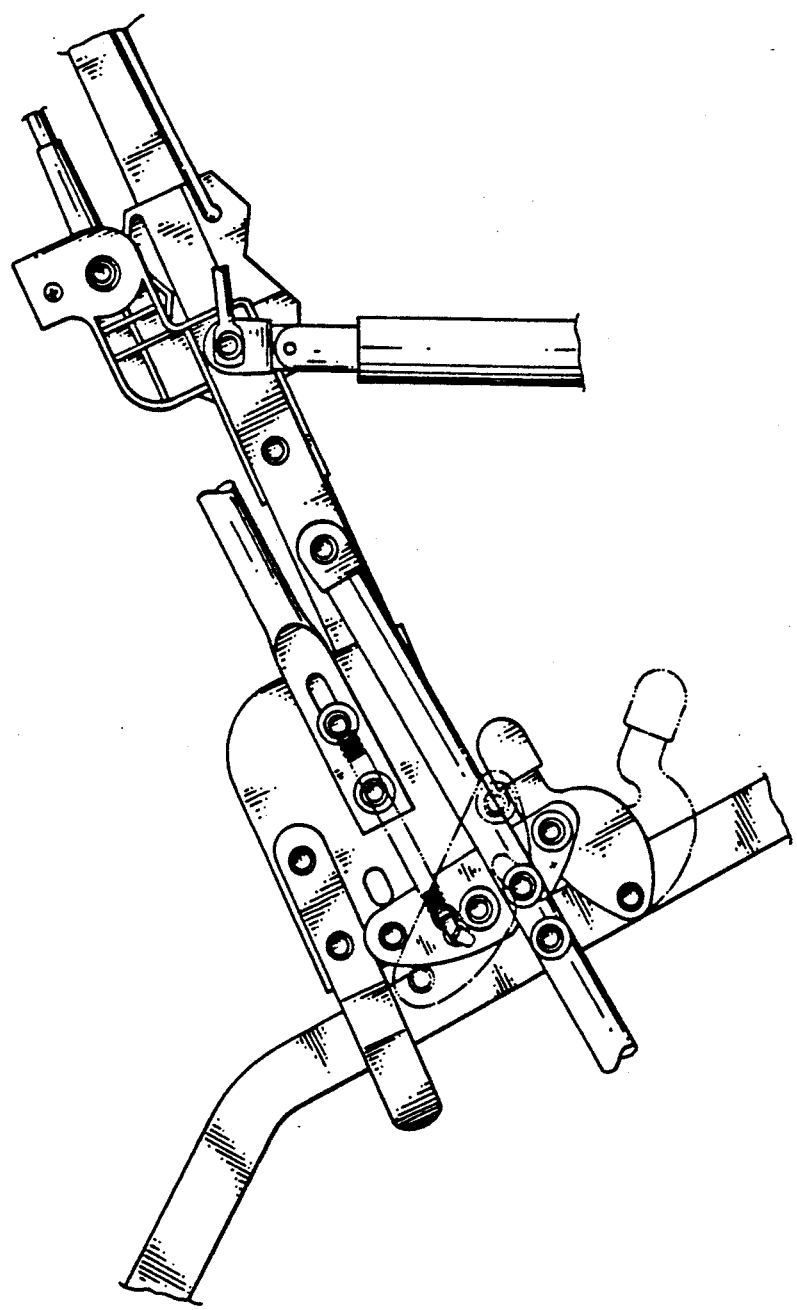
FIG. 2A is a plan view of a collapsible folding baby cart collapse control mechanism according to the prior art.
Figure 2B:
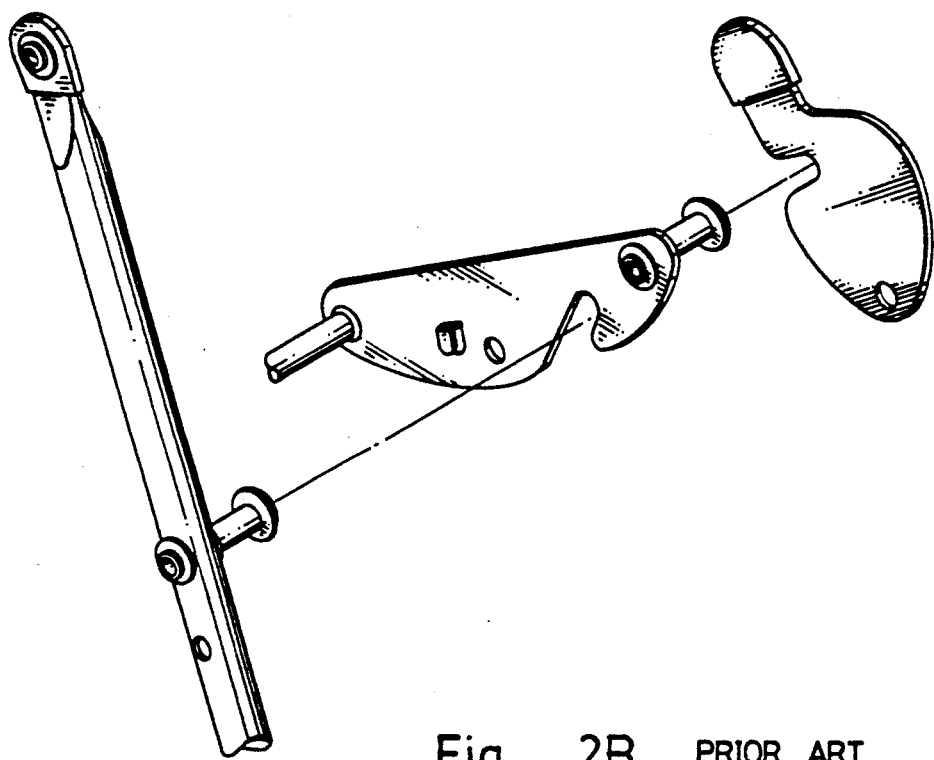
FIG. 2B is a partly exploded view of the collapsible folding baby cart collapse control mechanism of FIG. 2A.
Figure 3:
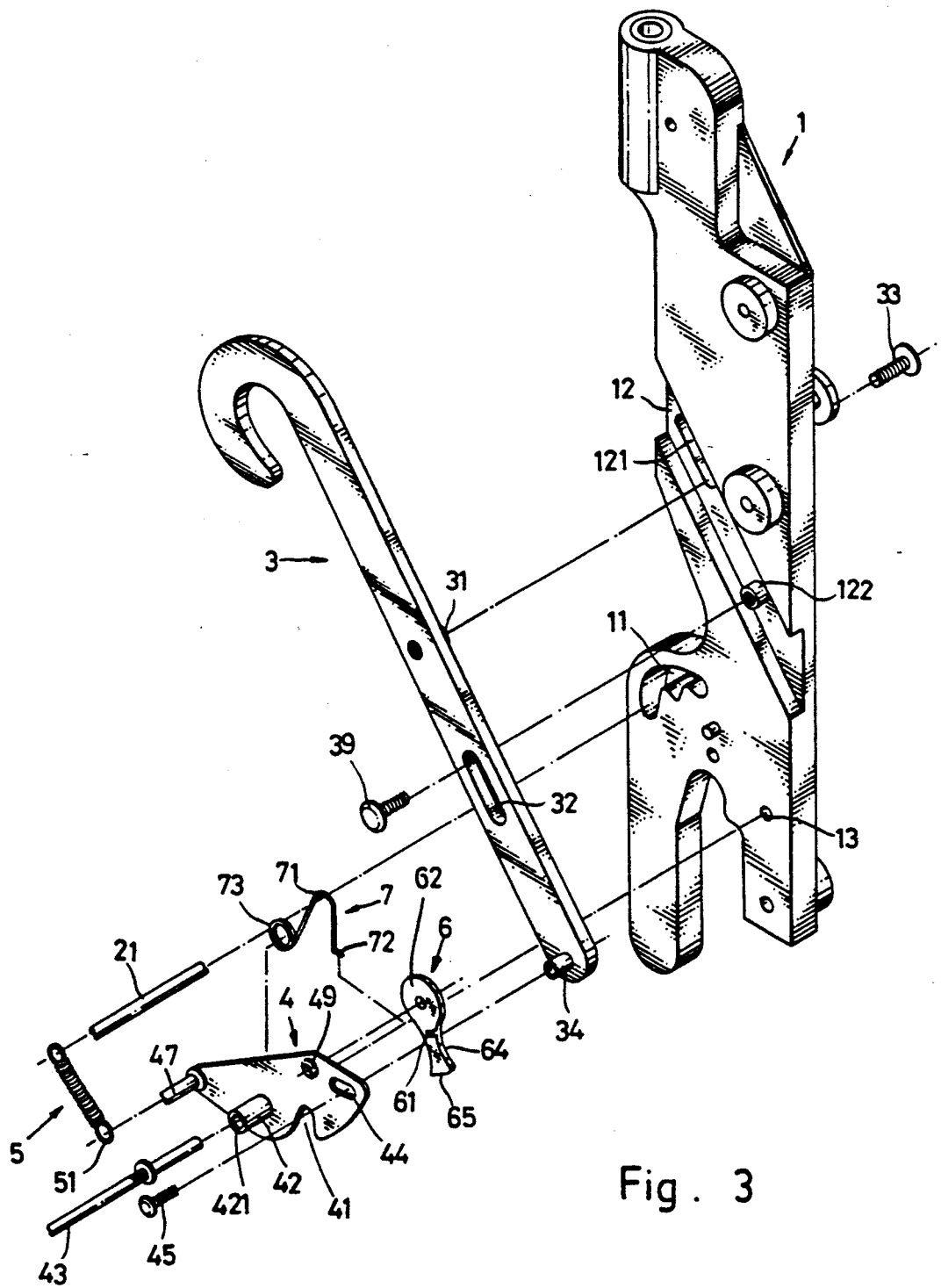
FIG. 3 is an exploded view of the collapsible folding baby cart collapse control mechanism according to the present invention.
Figure 4A:
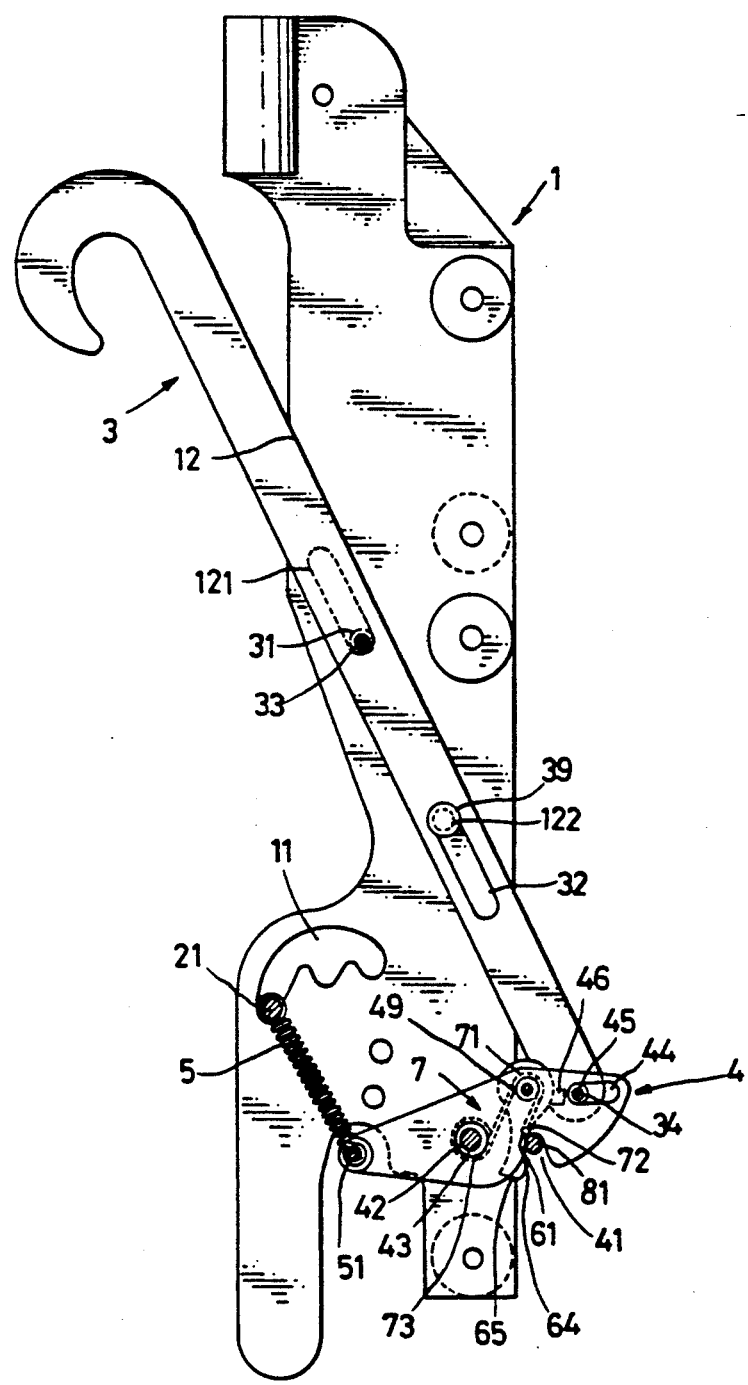
FIG. 4A is a plan view of the collapsible folding baby cart collapse control mechanism of FIG. 3 when fixed in locking position.
Figure 4B:
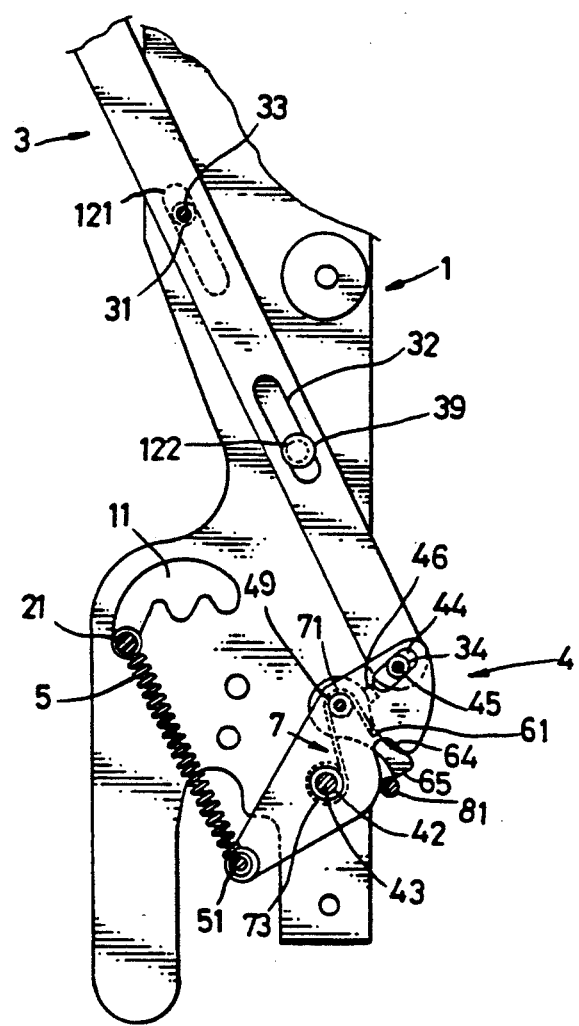
FIG. 4B is another plan view of the collapsible folding baby cart collapse control mechanism of FIG. 3, showing that the pull rod is pulled upwards to rotate the respective positioning plate into unlocking position.

Referring to FIGS. 3, 4A and 4B, a collapsible folding baby cart collapse control mechanism is generally comprised of two symmetrical upper frames 1 which have each an upper end connected to the respective hand rail (not shown), a lower end connected to the lower end of the baby cart's handle (not shown), and a multiple-position positioning slot 11 at a suitable location to hold the cross bar 21 of the baby cart's back rest in the desired position; two symmetrical pull rods 3 respectively connected to the upper frames 1 for collapse control; two positioning plates 4 respectively connected between the pull rods 3 and the cross bar 21 of the baby cart's back rest; two stop plates 6 respectively connected to the positioning plates 4; and two torsional springs 7 respectively connected between the positioning plates 4 and the stop plates 6.

Referring to FIG. 3 again, each upper frame 1 has a sliding slot 121 and an internally threaded stub tube 122 spaced on a groove 12 on an inner side, and a through hole 13 spaced from the multiple-position positioning slot 11 below the groove 12. Each pull rod 3 has a first internally threaded stub tube 31 on the middle on one side inserted through the sliding slot 121 on the respective upper frame 1 and secured in place by a screw 33, a sliding slot 32 spaced from the first internally threaded stub tube 31 into which the internally threaded stub tube 122 is inserted and secured in place by a screw 39, and a second internally threaded stub tube 34 on an opposite side adjacent to the bottom end thereof inserted through an elongated hole 44 on the respective positioning plate 4 and secured in place by a screw 45. Each positioning plate 4 has an elongated slot 44 hung on the second internally threaded stub tube 34 on the respective pull rod 3, a bottom notch 41 on one end hung on a locating rod 81 on a sub-frame of the baby cart's rear wheel frame, a stub rod 49 inserted into a hole (not indicated) on the respective stop plate 6, a stop rod 46 spaced from the stub rod 49 on the same side to limit the moving range of the respective stop plate 6, an axle holder 42, an axle 43 inserted through a hole 421 on the axle holder 42 into the through hole 13 on the respective upper frame 1 permitting the positioning plate 4 to be rotated on the respective upper frame 1 upon folding of the baby cart, and a connecting rod 47 on an opposite end connected to the cross bar 21 of the baby cart's back rest by a spring 5. The spring 5 has two opposite eyed ends 51 respectively hung on the cross bar 21 of the baby cart's back rest and the connecting rod 47 of the respective positioning plate 4. Each stop plate 6 has an eye head 62 on one end of the elongated body 65 thereof pivotably hung on the stub rod 49 on the respective positioning plate 4, and a hook 61 on the middle between the elongated body 65 and the eye head 62. Each torsional spring 71 has one end 73 connected to the axle 43 on the respective positioning plate 4, an opposite end 73 connected to the hook 61 on the respective stop plate 6, and a curved middle part 71 hung on the stub rod 45 of the respective positioning plate 4.

Referring to FIGS. 4A and 4B, when the baby cart is opened and set into shape, the notch 41 on each positioning plate 4 is hung on the locating rod 81 on the respective sub-frame of the baby cart's rear wheel frame, and each stop plate 6 is forced by the respective torsional spring 7 to stop with one side edge 64 thereof against the respective locating rod 81 (see FIG. 4A). Pulling the pull rods 3 upwards causes the respective positioning plate 4 to be carried by the second internally threaded stub tube 34 of the respective pull rod 3 to rotate on the respective axle 43, and at the same time each stop plate 6 is forced by the respective torsional spring 7 to stop against the respective locating rod 81 (see FIG. 4B). Under this condition, the baby cart will not be collapsed automatically. However, continuously pulling the pull rods 3 upwards causes the stop plates 6 to disconnect from the respective locating rod 81, and therefore the baby cart becomes collapsed.

I claim:

1. A collapsible folding baby cart collapse control mechanism comprised of two symmetrical upper frames having each an upper end connected to a baby cart's hand rail, a lower end connected to the baby cart's handle, and a multiple-position positioning slot to hold a cross bar of the baby cart's back rest; two symmetrical pull rods respectively connected to said upper frames for collapse control; two positioning plates respectively connected between said pull rods and the cross bar of the baby cart's back rest; two stop plates respectively connected to said positioning plates; and two torsional springs respectively connected between said positioning plates and said stop plates; wherein said upper frames have each a sliding slot and an internally threaded stub tube spaced on a groove on an inner side, and a through hole spaced from said multiple-position positioning slot below said groove; said pull rods have each a first internally threaded stub tube on the middle on one side inserted through the sliding slot on the respective upper frame and secured in place by a screw, a sliding slot spaced from the first internally threaded stub tube into which the internally threaded stub tube of the respective pull rod is inserted and secured in place by a screw, and a second internally threaded stub tube on an opposite side adjacent to a bottom end thereof inserted through an elongated hole on the respective positioning plate and secured in place by a screw; said positioning plates have each an elongated slot hung on the second internally threaded stub tube on the respective pull rod, a bottom notch hung on a locating rod on a sub-frame of the baby cart's rear wheel frame, a stub rod inserted into a hole on the respective stop plate, a stop rod spaced from the stub rod to limit movement of the respective stop plate within a fixed range, an axle holder, an axle inserted through a hole on the axle holder into the through hole on the respective upper frame permitting the respective positioning plate to be rotated on the respective upper frame upon folding of the baby cart, and a connecting rod on an opposite end connected to the cross bar of the baby cart's back rest by a spring; said stop plates have each an eye head on one end pivotably hung on the stub rod on the respective positioning plate, and a hook on the middle connected to either torsional spring; said torsional springs have each one end connected to the axle on the respective positioning plate, an opposite end connected to the hook on the respective stop plate, and a curved middle part hung on the stub rod of the respective positioning plate; pulling said pull rods upwards from said upper frames causes said positioning plates to be rotated on the respective axle permitting said stop plates to be forced by said torsional springs to stop against the respective locating rod, and continuously pulling said pull rods upwards from said upper frames causes said stop plates to disconnect from the respective locating rod permitting the baby cart to be collapsed.

* * * * *